United States Patent [19]
Gilmore

[11] 4,096,960
[45] Jun. 27, 1978

[54] HAYSTACK MOVER CONTROL MEANS

[76] Inventor: Charles L. Gilmore, P.O. Box 231, Sterling, Kans. 67579

[21] Appl. No.: 790,958

[22] Filed: Apr. 26, 1977

[51] Int. Cl.² ............................................... B60P 1/28
[52] U.S. Cl. ........................... 214/505; 214/DIG. 2; 214/508; 280/423 R
[58] Field of Search ............... 214/500, 505, 506, 508, 214/509, 83.36, DIG. 2; 180/14 A; 280/420, 421, 422, 423 R

[56] References Cited
U.S. PATENT DOCUMENTS

| | | | |
|---|---|---|---|
| 1,848,315 | 3/1932 | Cage | 214/DIG. 2 |
| 2,856,016 | 10/1958 | Lindeman | 280/421 X |
| 3,724,695 | 4/1973 | Taylor | 280/423 R X |
| 3,892,079 | 7/1975 | Hirano et al. | 214/DIG. 2 |

*Primary Examiner*—Albert J. Makay
*Attorney, Agent, or Firm*—Robert E. Breidenthal

[57] ABSTRACT

A wheeled hydraulically actuated haystack loader having a tiltable bed with conveyor chains thereon, such loader including as a part thereof an internal combustion engine driving a hydraulic pump. The loader also includes electrically actuated hydraulic valves for controlling the tilt of the bed and the drive of the chains. The loader can be detachably coupled to a pickup truck by a fifth wheel with the engine operation and the hydraulic valves being controllable from within the operator's cab of the truck by the provision of cabled electric circuit leads connected at one end of the cable to engine controls and to the hydraulic valves, with the other end of the cabled circuits being detachably coupled to an electric switch control box disposed in the operator's cab, whereby the engine's ignition, starter and choke as well as the tilt of the bed and the drive of the conveyor chains can be controlled by the driver of the truck. Detachment and removal of the switch box affords a degree of security against unauthorized operation of the engine and the loader.

9 Claims, 5 Drawing Figures

HAYSTACK MOVER CONTROL MEANS

The present invention relates to new and useful improvements for hay transporting systems of the type wherein a haystack loader in the nature of a trailer is detachably coupled to a pickup truck, and more particularly pertains to such a system being provided with remote control means (accessible to the driver of the truck) for controlling both the engine that powers the hydraulic circuits and the hydraulic motive means for tilting the bed of the loader and for driving the conveyor chains on the bed, whereby a single individual can operate the entire system in a coordinated manner.

Haystack movers of the type with which the present invention is concerned include a trailer that can be detachably coupled to a pickup truck by a conventional fifth wheel arrangement, with a bed being tiltably mounted on the trailer about a transverse horizontal axis so as to be tiltable from a normal horizontal transport position to a position such that the rear end of the bed is at ground level. Hydraulic means inclusive of a double-acting hydraulic cylinder is provided to control the tilt of the bed.

A rotary hydraulic motor drives a set of conveyor chains having upper flights disposed along the top of the bed in an arrangement such that hay disposed on the bed is driven forwardly or rearwardly thereon depending on the direction in which the rotary motor is driven.

Electrically controlled hydraulic valves are provided whereby the bed can be tilted up or down or retained in a selected attitude. Similar control provision is made for the rotary motor whereby the chains can be moved forwardly, rearwardly or stopped.

The trailer has a hydraulic pump mounted thereon for powering the tilt cylinder and the rotary motor as well as an internal combustion engine for driving the hydraulic pump.

Although the engine can include an automatic speed control or governor so as to be self regulating during operation it has heretofore been necessary that a person must be at and directly attend the engine during the starting of same such as by turning on the ignition, operating the starter motor and choking the same as is usually required with conventional gasoline engines. Stopping of the engine also has required the immediate presence of the operator. The foregoing has either required the loss of time and inconvenience of the driver of the truck stopping the truck and dismounting therefrom to operate the engine controls or the service of an additional person.

An even greater shortcoming of systems heretofore in use resides in the fact that such equipment has the control switches for the hydraulic valves mounted on the trailer, usually adjacent the engine.

Considering the fact that the loading on and unloading of a haystack from the haystack mover, especially the former, requires coordinated movement of the truck and the conveyor chains and virtually demands the services of a person in addition to the services of the truck driver. For example, to load a haystack the truck is maneuvered to a position such that the mover can be backed toward the haystack and the bed must then be tilted to place its rear end at ground level. The truck is then slowly backed with the conveyor chains driven for forward movement so that the haystack is urged forwardly on the bed as the latter moves into the position initially occupied by the haystack. As soon as the haystack is sufficiently forward on the bed, the conveyor chains are stopped and it is preferred that rearward movement of the truck be also stopped at this time. The bed is then tilted to its horizontal position, after which the system is in transport condition such that the truck and its tow can be driven to the site at which the haystack is to be unloaded. Unloading is essentially accomplished by reversing the loaded procedure described above.

While the services of a person in addition to the driver are entirely unnecessary during actual transport which period may constitute a very large proportion of the total time of system utilization, movers heretofore in use have made it very difficult (if not impossible) and quite possibly dangerous for loading and unloading to be handled single handedly. This is true as the driving of the truck should be carefully synchronized and coordinated with control of bed tilt and the bed conveyors.

As the second man has been necessary, the necessity for direct attendance upon the engine has not heretofore been deemed particularly a burden as a second man was present to attend to such chores.

The instant invention has for its primary purpose enabling the driver of the truck to drive the truck at the same time as he has control of the tilt and conveyor functions of the bed, whereby the second man is not required and whereby a greater degree of coordination in truck and bed operation can be realized as no communication between the driver and a second man is required. The potential ill-consequences of a misunderstanding or a breakdown in such communications are also sought to be avoided.

An important purpose of the invention is to enable the driver to start and stop the pump driving engine without having to leave his driving position or stopping the truck as the need for the services of a second man are obviated in realizing the primary purpose of the invention and will not be available for attendance upon the engine.

Yet another purpose of the invention is to afford security against unauthorized operation of the engine and the hydraulic units.

An appreciation of the background of the present invention can be obtained on reference to the following U.S. Pat. Nos.: 3,800,966, Newton, Apr. 2, 1974; 3,415,400, Olin, Dec. 10, 1968; 3,298,550, Schlitz, Jan. 17, 1967; 3,209,932, Schlitz, Oct. 5, 1965; 3,521,762, Walters, July 28, 1970; 3,198,364, Anderson, Aug. 3, 1965.

Viewed broadly, the invention involves mobile material handling apparatus and controls therefor, comprising a wheeled trailer, hydraulic fluid actuated means mounted on said trailer for controlling hydraulic fluid actuating of the hydraulic fluid actuated means, an internal combustion engine mounted on the trailer and drivingly coupled to a hydraulic pump that is operationally connected to said valves, said trailer being provided with fifth-wheel towing vehicle coupling means at its forward end, said engine including electrically operated components, and electrical control means for said valves and for said components, said control means including an array of electric switches and an elongated flexible multiconductor electric cable having its conductors at one end thereof operatively connected to the valves and the engine components and having its conductors at its other end operatively connected to said array of switches, said cable having a length such as to be extendible to position its said other end forwardly of the fifth-wheel coupling means, whereby the valves and the engine components can be controlled from a position remote from the valves and the engine.

The invention and its advantages will be readily understood in the light of the following description of a preferred embodiment of the invention, such embodiment being illustrated in the accompanying drawings, wherein:

FIG. 1 is a partial side elevational view of the system, the forward portion of the pickup truck being broken away. The forward end of the mover is shown with the support jack in lowered position, and a haystack is partially shown in dashed outline;

FIG. 2 is generally similar to FIG. 1 and shows the pickup truck in its entirety with the rear portion of the mover being broken away. This figure shows the control cable connecting the trailer mounted power unit connected to the control switch box in the operator cab of the truck with hidden parts as well as an alternate position thereof being shown in dashed outline. Also shown in dashed outline is a tilted presentation of the bed and a showing of a haystack on the bed;

Figure 1:
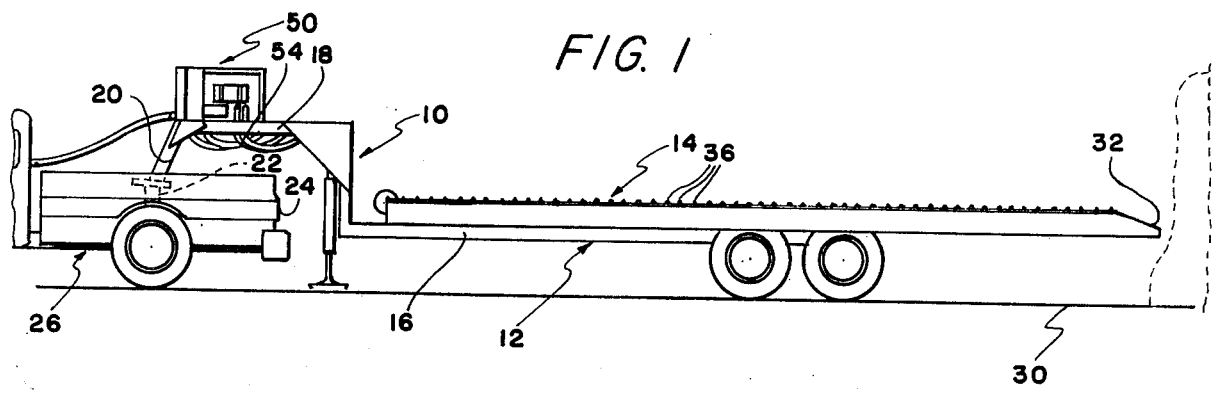

Referring now to the drawings wherein like numerals designate like parts throughout the various views, the reference numeral 10 designates the haystack moving system generally, the same being principally comprised of wheeled trailer 12. A bed 14 is pivotally mounted on the trailer frame 16. The forward end portion of the trailer frame 16 is offset upwardly as shown at 18 to overlie and to enable detachable coupling of the trailer 12 by way of a strut 20 to a conventional fifth wheel means shown in dashed outline at 22 that is positioned on the cargo bed 24 of a conventional pickup truck 26.

Conventional jack means 28 of retractable character are carried by a trailer frame 16 which can be lowered to support the forward end of the trailer 12 at a desired height above ground level 30.

The trailer 12 and bed 14 combination include features that do not in themselves constitute inventive subject matter herein, and consequently are not described in detail. Those not fully conversant with the art can refer to the disclosures of the patents previously mentioned to obtain a complete understanding of the character of and function of such features. For present purposes, it suffices to note that the bed 14 is tiltable between the full and dashed line showings thereof in FIG. 2 whereby the bed 14 can be tilted between a horizontal transport position and a loading/unloading position such that the rear end 32 of the bed 14 is at ground level 30. Hydraulic means inclusive of a double-acting cylinder shown in dashed outline at 34 enables the bed 14 to be tilted in a controlled fashion by a control means to be presently described and which is an integral part of the instant invention.

The bed 14 incorporates conventional chain conveyor means, the teeth or fingers of which appear at the upper surface of the bed 14 and which are designated by the reference numeral 36. The chain means are conventionally driven to move the fingers 36 forwardly or rearwardly along the top of the bed 14 by a rotary hydraulic motor, not shown, the forward and reverse operation of the latter being subject to the control means presently to be described.

Figure 2:
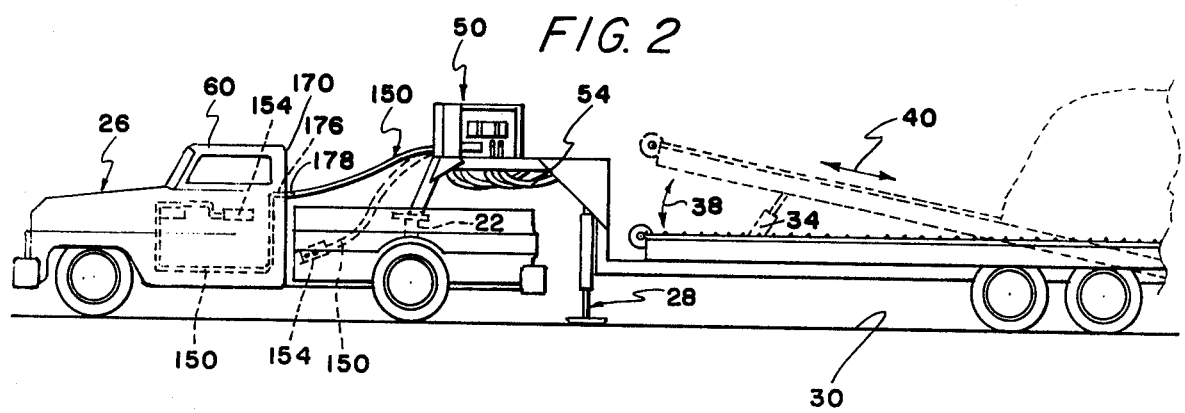

As thus far described, the system 10 includes a controllable hydraulically powered means for tilting the bed 14 as indicated by the double-headed arrow 38 in FIG. 2 and for moving the conveyor means forwardly and rearwardly indicated by the double-headed arrow 40 in FIG. 2.

The engine conventionally includes a governor, not shown, for self regulation as to engine speed, and also quite conventionally the hydraulic pump is operatively associated with a pressure regulator and bypass as well as a pressure accumulator, none of which are specifically shown as they are well known in the art and do not in themselves constitute the subject matter of the instant invention. It will be noted that detailed illustration and/or description of conventional provisions that in their detail do not constitute the subject matter of the invention would only serve to obfuscate the latter.

The hydraulic power output of the prime mover unit 50 is controlled by an electric solenoid powered stack valve assembly 52 which is connected by hydraulic lines visible at 54 to the previously described hydraulic actuators of the tilting of the bed 14 and the conveyor means 36.

In prior art combinations of the general type thus far described, the stack valve is typically actuated manually rather than by electrical solenoids, and the controls for starting and stopping the engine as well as the manual controls of the stack valve are disposed at the prime mover unit 50 and are carried by the trailer frame 16. Suffice to say the starting and stopping controls for the engine as well as the controls for the stack valve (be the latter manually or solenoid actuated) are completely out of reach of anyone in the driver or operator's cab 60 of the truck 26, and for the driver of the truck 26 to start or stop the engine or to exercise any control function as to the hydraulic system it is necessary for him to stop the truck 26, dismount from the same and to then effect the desired function at the power unit 50.

In accordance with the present invention, the power unit 50 has in association with the engine thereof an electric storage battery 62 that is kept in a charged condition by conventional means that includes an engine driven alternator 64 having an output controlled by a voltage regulator 66.

The engine of the unit includes a conventional electric ignition system that is selectively energizable by control circuit means to be described presently. A conventional electric engine starter means is also provided as well as an electrically actuated engine choke means and the starter and choke means are controlled by electrical means also presently to be described.

Figure 3:
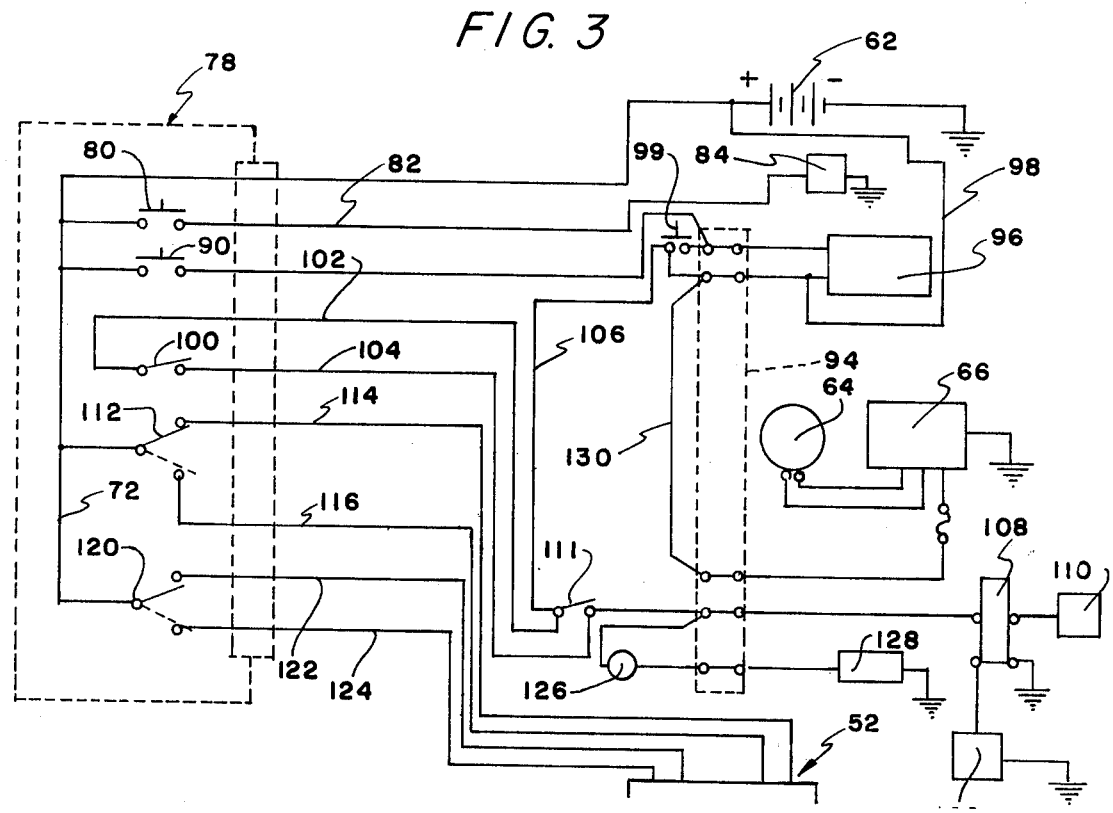
FIG. 3 is a schematic diagram of the electric switch control box and its operative association with engine controls and the hydraulic valve stack.

Referring particularly to FIG. 3, it will be seen that the negative terminal of the battery 62 is grounded at 68 and the positive terminal is connected by a lead 70 to the power lines 72 in an array of electric control switches designated generally at 78.

The switch array 78 includes a normally open push button switch 80 connected between the lines 72 and a lead 82 that is connected to an electrically actuated engine choke valve 84 so that the latter is actuated whenever the switch 80 is pushed to its closed position.

Another normally open push button switch 90 is connected between the lines 72 and a lead 92 that is connected through a pair of terminals of a terminal strip indicated in dashed outline at 94 to the relay solenoid of a conventional electric starter assembly 96. The assembly 96 is connected for starter motor operation to the battery 62 by a lead 98. The arrangement is such that the engine is driven for starting purposes when the switch 90 is pushed closed.

If desired, a push button swtich 99 can be disposed at the power unit 50 and connected in electrical parallel with the switch 90 so the unit can be started by a person at such location.

A single-pole, single-throw switch 100 is connected by leads 102 and 104 in an arrangement such that the ignition system of the engine of the unit 50 is energized when and only when the switch 100 is closed, the lead 102 being connected to the positive battery terminal via a lead 107, the terminal strip 94 and the lead 98, and the lead 104 being connected via the terminal strip 94 to the primary of an ignition coil 108. The ignition coil 108 has its primary connected to a conventional engine driven breaker point assembly 109, and the secondary of the coil 108 is grounded as shown and coupled to the distributor and spark plugs indicated in block form at 110.

If desired, a toggle switch 111 can be disposed at the unit 50 in parallel with the switch 100 so that the ignition can be turned on and off at the engine.

If switches 99 and 111 are to be included, they are provided with security means therefor, not shown, such as to forestall unauthorized operation by requiring the use of a key or knowledge of a combination, etc.

A single-pole, double-throw switch 112 is connected to the bus 72 in an arrangement such that the switch 112 enables selectively coupling the bus 72 to either one or the other of two leads 114 and 116 that are connected to the electrically controlled stack valve 52. The arrangement is such that when the switch 112 is in its illustrated full line position, the appropriately grounded solenoid, not shown, of the stack valve 52 operable to tilt the bed 14 by means of the hydraulic cylinder 34 to the horizontal full line showing thereof in FIGS. 1 and 2 is energized. The arrangement is such that when the switch 112 is in its dashed position, an appropriately grounded solenoid, not shown, of the stack valve 52 operable to tilt the bed 14 to its tilted dashed position is energized.

The switch array 78 also includes a second single-pole, double-throw switch 120 connected to the bus 72 for selective energization therefrom of leads 122 and 124, such leads 122 and 124 being respectively connected to appropriately grounded solenoids, not shown, of the stack valve 52 that are operable to valve the rotary motor into reverse or forward movement.

The switch 112 is of the toggle type wherein the toggle lever is spring urged into an intermediate or neutral position such that neither of the leads 114 and 116 is normally energized, with force being required in one direction or the other against the action of the spring to energize either of the leads 114 and 116 for as long as required.

The switch 120 is of the same type as switch 112, and is biased to its center or neutral position so that neither of the leads 122 and 124 is normally energized.

From the foregoing, it will be evident that the engine of the power unit 50 can be of generally conventional character excepting for the provision of the switch array 78 and its connections to the engine. It will be noted that when the ignition switch 100 (or switch 111) is closed, energization of an oil pressure gauge 126 is effected, such gauge 126 being connected to an oil pressure sensor unit 128 through the terminal strip 94 as shown.

Though the alternator 64 and voltage regulator 66 are shown as being connected to the battery 62 by a jumper wire 130 connecting terminals of the terminal strip 94, such jumper wire 130 can be replaced by an ammeter, not shown, connected between such terminal strip terminals.

Figure 4:
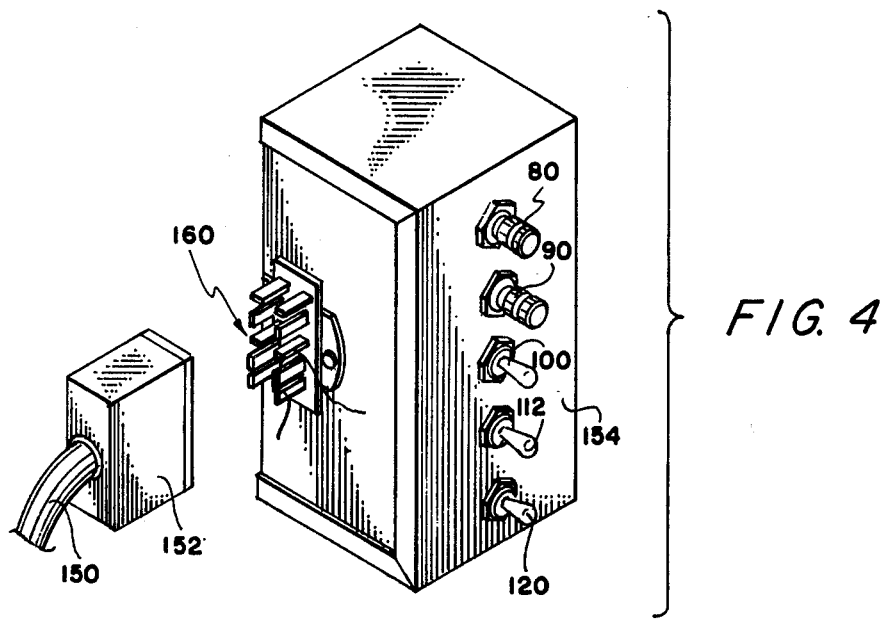
FIG. 4 is a fragmentary showing of the jack equipped operator end of the cabled electric circuit leads in disconnected relationship to the electric control switch box, the jack and the box being depicted isometrically; and, FIG. 5 is a diagrammatic illustration of the array of switches of the control box and their connections to the cable jack shown in dashed outline.
Figure 5:
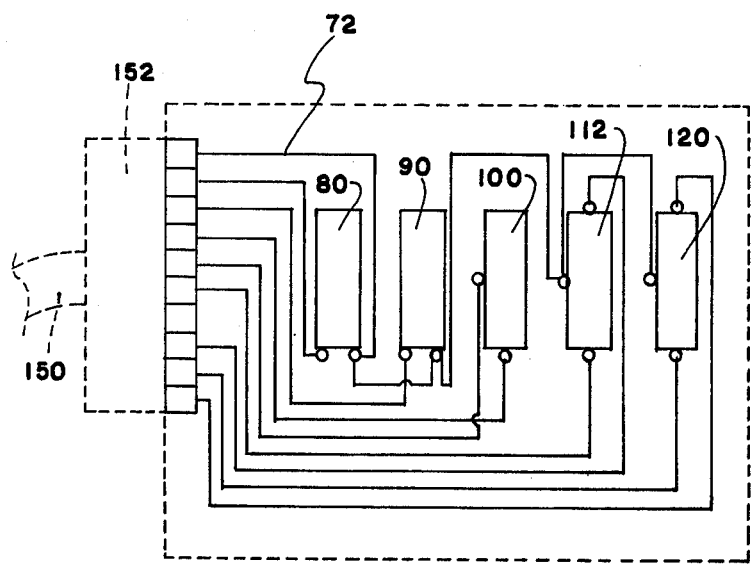

All the leads 70, 82, 92, 102, 104, 114, 116, 122 and 124 are cabled or incorporated in an elongated single insulated and flexible cable or electric conduit means 150, and the end of the conduit 150 remote from its various connections to the engine and stack valve of the prime mover unit 50 described above is provided with a jack structure 152. The array of switches 78 are mounted within a metal housing or box 154 with the push buttons and toggle levers of such switches projecting from the box 154 as shown in FIG. 4. The leads of the switches of the array 78 are connected to a multiprong plug means 160 with the prongs 162 thereof projecting outwardly from a side of the box 154 as shown in FIG. 4.

The jack means 152 and the plug means 160 are such as to mate with each other in a detachable manner in an arrangement such that when so mated the continuity of the leads of the conduit 150 to the switches of the array 78 is uninterrupted in accordance with FIG. 3. Decoupling the plug means 160 from the jack means 152 serves to effectively sever the leads of the conduit 150 in such a manner that does not permit inadvertent electrical shorting of such leads and which precludes unauthorized operation of the power unit 50.

It will be noted that the plug means 160 and the jack means jointly constitute an electric coupling means. In the preferred construction the conduit 150 is extended through the rear wall 170 of the truck cab 60 and thence to a position of convenience to the driver within the cab 60 such as that suggested in dashed outline in FIG. 2. Such preferred construction also optionally entails the length of conduit 150 within the cab being separable from the length of conduit 150 are detachably connected by means of a plug means 176 (similar to the plug means 160) fixed to the wall 170 to extend therethrough with its prongs projecting rearwardly of the cab 60, it being understood that the portion of the conduit 150 within the cab 60 is electrically connected to the plug means 176. The forward end of the conduit 150 that is external of the cab 60 is provided with jack means 178 detachably matable in a selectable manner with either the plug means 160 of the control box 154 or the plug means 176 fixed to the cab wall 170.

The arrangement is such that the control box 154 can be operatively connected when disposed in the cab 60 for operation by the truck driver, or if circumstances arise wherein a second person (or dismounted driver) can or must control the unit 50 from a position outside the cab the rear portion of the conduit 150 is decoupled from the plug means 176 and directly coupled to the switch box 154. The latter arrangement is illustrated by the dashed line showings of the conduit 150 and of the box 154 external to the cab 60 in FIG. 2. Operation in such an arrangement may, for example, be prudent when the haystack moving system 10 is being operated on unlevel ground and extraordinary care in the tilt control be indicated.

Having illustrated and described the invention sufficiently to enable those of modest skill in the art to practice and enjoy the same, attention is now directed to the appended claims definitive of the scope of the invention.

I claim:

1. Mobile material handling apparatus and controls therefor, comprising a wheeler trailer, hydraulic fluid actuated means mounted on the trailer for handling material, electrically operated valves mounted on said trailer for controlling hydraulic fluid actuation of the hydraulic fluid actuated means, an internal combustion engine mounted on the trailer and drivingly coupled to a hydraulic pump that is operationally connected to said valves, said trailer being provided with fifth-wheel towing vehicle coupling means at its forward end, said engine including electrically operated components, electrical control means for said valves and for said components, said control means including an array of electric switches and an elongated flexible multiconductor electric cable having its conductors at one end thereof operatively connected to the valves and the engine components and having its conductors at its other end operatively connected to said array of switches, said cable having a length such as to be extendible to position its said other end forwardly of the fifth-wheel coupling means, whereby the valves and the engine components can be controlled from a position remote from both the valves and the engine, and said electrically operated components including an ignition system therefor, and an electric starter therefor, whereby the engine, even when cold, can be started and stopped from said remote position.

2. Mobile material handling apparatus and controls therefor, comprising a wheeled trailer, hydraulic fluid actuated means mounted on the trailer for handling material, electrically operated valves mounted on said trailer for controlling hydraulic fluid actuation of the hydraulic fluid actuated means, an combustion engine mounted on the trailer and drivingly coupled to a hydraulic pump that is operationally connected to said valves, said trailer being provided with fifth-wheel towing vehicle coupling means at its forward end, said engine including electrically operated components, electrical control means for said valves and for said components, said control means including an array of electric switches and an elongated flexible multiconductor electric cable having its conductors at one end thereof operatively connected to the valves and the engine components and having its conductors at its other end operatively connected to said array of switches, said cable having a length such as to be extendible to position its said other end forwardly of the fifth-wheel coupling means, whereby the valves and the engine components can be controlled from a position remote from the valves and the engine, and plug and jack means detachably coupling the array of switches to the conductor of the cable, whereby unauthorized control of the valves and the engine components is substantially precluded on detachment and removal of the array of switches.

3. The combination of claim 2, wherein the jack component of the plug and jack means is directly connected to the conductors of the cable.

4. The combination of claim 3, wherein said electrically controlled components of the engine include an ignition system that is connected for energization to an electric battery carried by the trailer by an electric circuit inclusive in electrical series a pair of said conductors and one of the switches of the array of switches.

5. The combination of claim 1, together with a self-propelled towing vehicle having means for coacting with the fifth-wheel means of the trailer, said vehicle having an operator's position and with said array of switches being accessible at said operator's position.

6. The combination of claim 3, together with a self-propelled towing vehicle having means for coacting with the fifth-wheel means of the trailer, said vehicle having an operator's position with said array of switching being accessible at said operator's position, said operator's position being enclosed by a cab structure, said cab structure including a wall, and said cable being of two sections that are detachably coupled by a plug and jack means, that extends through the cab wall, one section of cable being disposed in the cab and having the conductors thereof directly connected to the plug component of the last mentioned plug and jack means, said jack components of both of the plug and jack means being identical, whereby the switch array can be selectively connected to either of the two cable sections.

7. The combination of claim 1, wherein said hydraulic fluid actuated means includes a hydraulic means selectively operable under the control of said valves to move in one direction and a reverse direction, with one of the switches of said array of switches being a single-pole, double-throw electric switch operatively connected to said valves for controlling movement of the hydraulic means in one direction when the switch is thrown in one direction and in the reverse direction when the switch is thrown in the opposite direction.

8. The combination of claim 2, wherein said hydraulic fluid actuated means includes a hydraulic means selectively operable under the control of said valves to move in one direction and a reverse direction, with one of the switches of said array of swiches being a single-pole, double-throw electric switch operatively connected to said valves for controlling movement of the hydraulic means in one direction when the switch is thrown in one direction and in the reverse direction when the switch is thrown in the opposite direction.

9. The combination of claim 8, wherein said electrically controlled components of the engine include an ignition system that is connected for energization to an electric battery carried by the trailer by an electric current inclusive in electrical series a pair of said conductors and another of the switches of the array of switches.

* * * * *